INVENTOR
Kenneth E. Bean
Paul S. Gleim
BY
ATTORNEY

METHOD OF PREPARING SILICON NITRIDE FILMS

Filed June 27, 1967 6 Sheets-Sheet 2

METHOD OF PREPARING SILICON NITRIDE FILMS

United States Patent Office 3,549,411

Patented Dec. 22, 1970

3,549,411

METHOD OF PREPARING SILICON NITRIDE FILMS

Kenneth E. Bean, Richardson, and Paul S. Gleim, Dallas, Tex., assignors to Texas Instruments, Incorporated, Dallas, Tex., a corporation of Delaware Filed June 27, 1967, Ser. No. 649,299

Int. Cl. B44d *1/02*

U.S. Cl. 117—69 3 Claims

ABSTRACT OF THE DISCLOSURE

Disclosed is a method for adjusting various physical and chemical properties of chemically vapor deposited silicon nitride films by regulating the composition of the reactant gas stream. Among these properties are etch resistance, refractive index, relative dielectric constant, hardness, coefficient of thermal expansion, and thermal conductivity.

RELATED PATENT APPLICATION

Ser. No. 561,809 filed June 30, 1966.

This invention relates to the chemical vapor deposition of silicon nitride and more particularly to the deposition of silicon nitride films over the surface of a substrate by the reaction of a vapor source of silicon and a vapor source of nitrogen. The chemical vapor deposition reaction may be promoted either thermally or by glow discharge.

In accordance with the method of this invention, the composition of silicon nitride films can be adjusted as desired so as to vary, by controlling the composition of the reactant gas stream, various physical and chemical properties of the silicon nitride films deposited. Among the properties which may be adjusted are the etch resistance, refractive index, relative dielectric constant, hardness, coefficient of thermal expansion, and thermal conductivity.

The capability of controlling the composition of silicon nitride films so as to select specific physical and chemical characteristics of the kind described above is of great advantage in many applications such as in forming low reflectance coatings for optical and photosensitive devices and for insulating thin films. Moreover, the capability of forming graded coatings is advantageous for forming protective films having good adherence and compatibility with the substrate material while possessing stable and inert surface qualities.

Accordingly, it is an object of the invention to provide a method of controlling the composition of silicon nitride films so as to select specific physical and chemical characteristics, such as etch resistance, refractive index, relative dielectric constant, hardness, coefficient of thermal expansion, and thermal conductivity. A further object of the invention is to provide a method of preparing graded composition silicon nitride films wherein the properties of the film vary with composition.

These and other objects, features and advantages of the invention may be better understood by reference to the following description taken in conjunction with the appended claims and the accompanying drawings wherein:

FIG. 9 is a graph showing the relation of relative dielectric constant of silicon nitride and the silane to ammonia ratio in the reactant gas stream; while

Various techniques may be used for depositing silicon nitride in accordance with the invention. Where it is desirable to deposit at low substrate temperatures, glow discharge reactions are preferred. R.F. promoted glow discharge techniques have been described by Sterlin and Swann, Solid-State Electronics, vol. 8, pp. 653–654, Pergamon Press (1965). The thermally promoted reaction of silane and ammonia in hydrogen is well known and produces extremely stable, chemically resistant films of silicon nitride.

Figure 1:
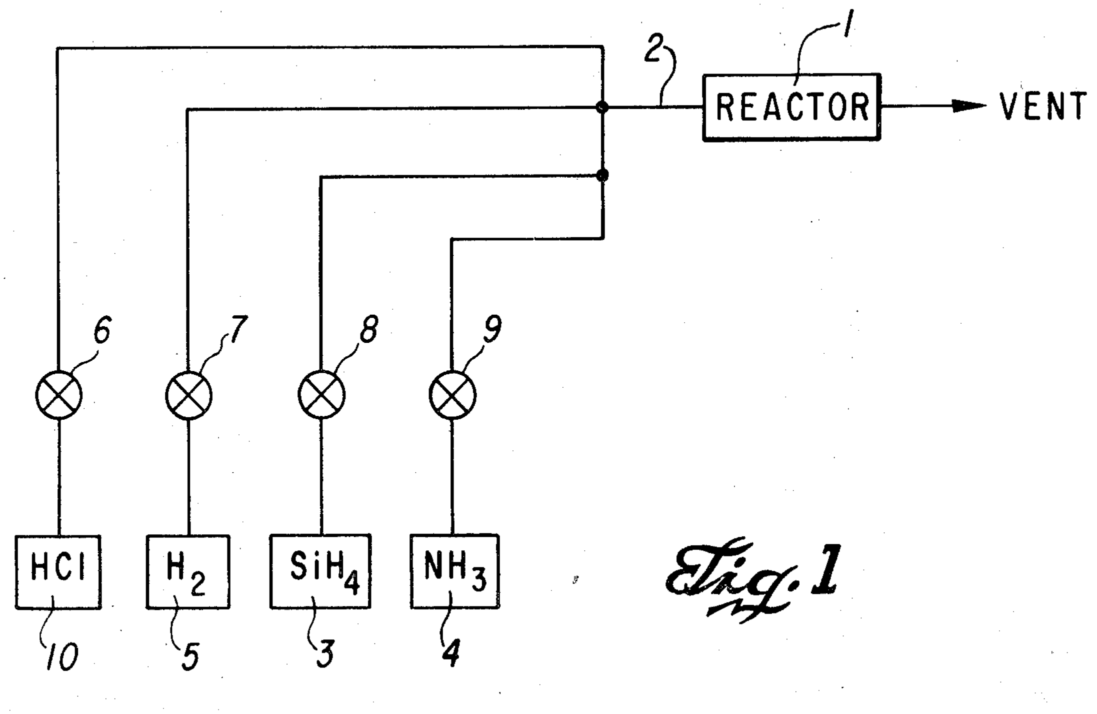
FIG. 1 is a schematic diagram showing one form of apparatus utilized in depositing silicon nitride in accordance with the method of the invention.

By way of example, reference is had to FIG. 1 wherein is depicted suitable apparatus for depositing silicon nitride by the reaction of a vapor source of silicon (silane, $SiH_4$) and a vapor source of nitrogen (ammonia, $NH_3$). The invention therefore will be described in detail with respect to the reaction of ammonia and hydrogen. The apparatus comprises a reactor furnace 1 which may be of a horizontal or vertical type suitable for single or multiple substrates and may be heated by any suitable means. The substrates (not shown) are disposed within the furnace in such a position as to expose the surface to be coated to gases directed into the reactor 1 through a conduit 2. Silane ($SiH_4$) and ammonia ($NH_3$) vapors are introduced into the conduit 2 from cylinders 3 and 4 containing silane and ammonia, respectively.

A stream of purified dry hydrogen ($H_2$) enters the conduit 2 from cylinder 5 to insure transport of the reactants through the furnace. The flow of the gases is regulated by conventional valves 6–9. Provision is also made for substrate cleaning prior to deposition by vapor phase etching, for example by HCl (from cylinder 10) and $H_2$.

In accordance with the method of the invention, the composition of the deposited silicon nitride films is controlled by regulating the ratio of silane to ammonia entering the reactor 1 through conduit 2. This ratio is determined by the use of valves 8 and 9. Decreasing the flow of ammonia through valve 9 with respect to the flow of silane through valve 8 increases the ratio of silane to ammonia, which increases the proportion of silicon in the deposited silicon nitride. Increasing the flow of amonia with respect to the flow of silane decreases the ratio of silane to ammonia, which increases the proportion of nitrogen in the deposited silicon nitride. It will be understood by those skilled in the art that the concentration of silicon relative to available nitrogen in the reactant gas stream is being regulated. Hence, it may be said that the control of the ratio of available silicon to available nitrogen in the gas stream or more specifically at the reactant substrate interface, which in turn controls the composition of the silicon nitride film deposited, is basic to the invention.

It will be seen from the following description that the composition of silicon nitride films may be controlled in accordance with the method of the invention so as to produce selected specific physical and chemical characteristics in silicon nitride films by varying the ratio of silicon to nitrogen, and particularly the silane to ammonia ratio in the reactant gas stream. It has been found that these characteristics can be varied over an unexpectedly broad range. This discovery leads to many new applications of silicon nitride films, as will be described hereinafter. According to the present invention, not only can a deposit of a particular composition be selected, but graded compositions can be formed by varying the ratio of available silicon to available nitrogen in the reactant gas stream during deposition. The manner in which various physical and chemical properties of the films are influenced by composition is set out in the detailed description which follows.

While the invention is described with respect to silane and ammonia, it will be apparent to those skilled in the art that other sources of silicon and nitrogen may be employed. By way of example, halide substituted silanes may be used as a source of silicon. However, silane is preferred because of its relatively low decomposition temperature and because its use avoids the formation of undesirable halide by-products such as ammonium chloride. Other amines, such as hydrazine, may be substituted for ammonia.

MORPHOLOGY AND FILM COMPOSITION

Films deposited at temperatures below about 900° C. appear amorphous and show no X-ray diffraction lines. Between 900° C. and 1000° C. some small crystallites grow over the surface, and at about 1100° C. the crystallites are almost continuous. X-ray diffraction data show that these crystallites are alpha $Si_3N_4$.

Because varying physical properties result as deposition conditions are changed, the actual amorphous film composition can be varied over rather wide limits from pure silicon to stoichiometric silicon nitride, $Si_3N_4$, and even nitrogen rich silicon nitride. Additionally, those films deposited at lower temperatures can contain hydrogen, as well as silicon and nitrogen.

Figure 2:
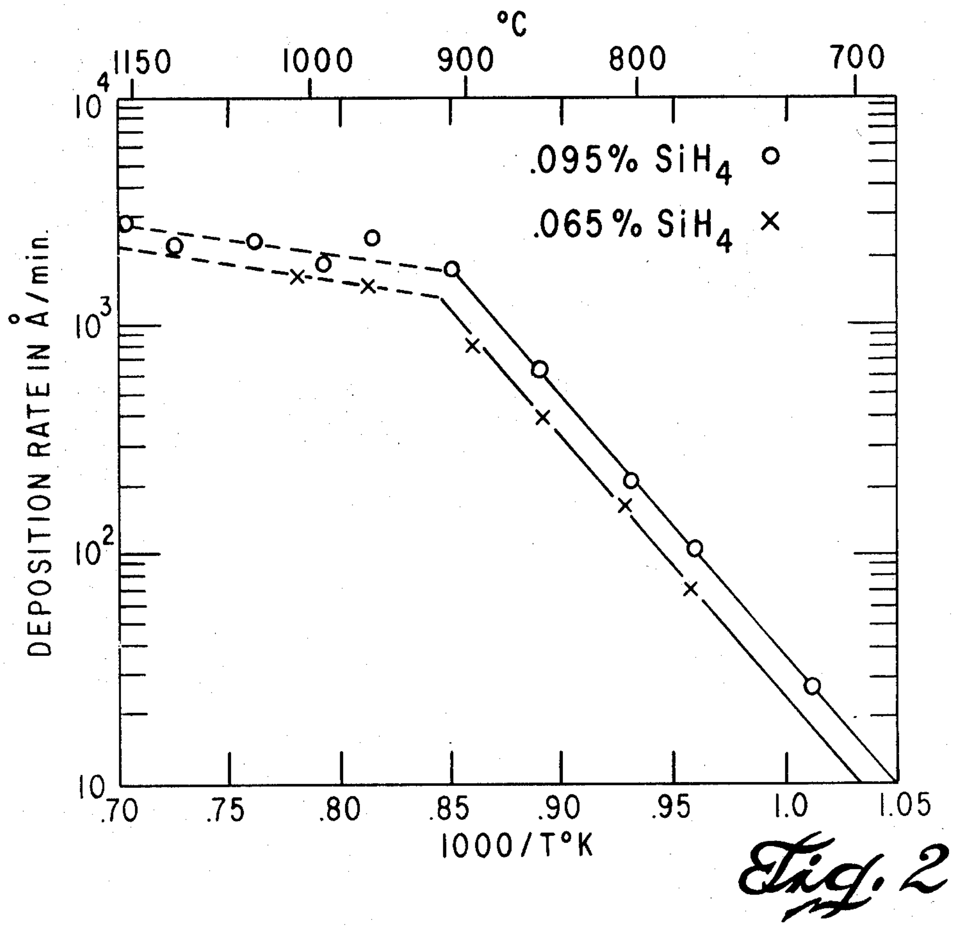
FIG. 2 is a graph showing the effect of temperature on the deposition rate of silicon nitride.

The effect of temperature on deposition rate is shown in FIG. 2. The log of the deposition rate vs. 1/T plots are given for silane concentrations of 0.095% and 0.065% (all percentages are volume percent) with a fixed concentration of 1.2% ammonia, where the gas stream flow rate was 40 liters/minute. The film growth rate increases rapidly with temperature up to about 900° C. Above this temperature the growth rate becomes less temperature dependent. The apparent activation energy below 900° C. is approximately 52 Kcal./mole and above 900° C., 6 Kcal./mol. The reason for the change in deposition rate may be related to the transition from amorphous ot crystalline character of the films, which occurs at approximately 900° C. Alternately, the decrease in temperature dependence may merely mark the entrance into a diffusion controlled reaction which would be expected to be nearly temperature insensitive.

Figure 3:
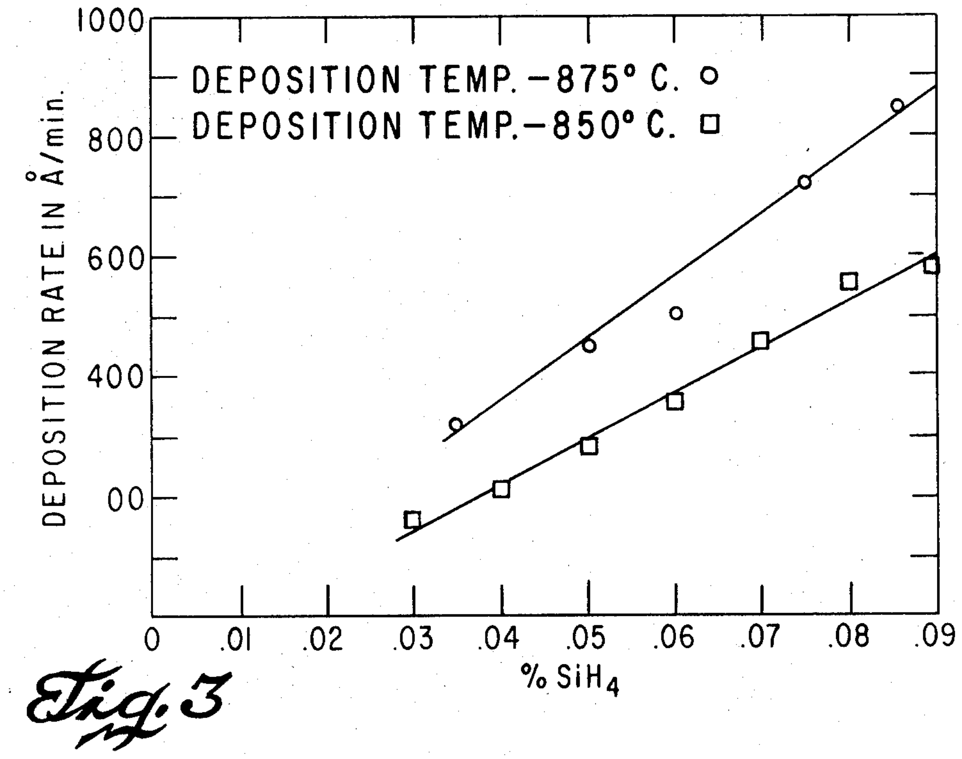
FIG. 3 is a graph showing the relation of deposition rate of silicon nitride and the concentration of silane in the reactant gas stream.

A graph of deposition rate as a function of percent silane at deposition temperatures of 850° and 875° C. is shown in FIG. 3 for films deposited from a gas stream with a fixed concentration of 1.2% ammonia having a flow rate of 40 liters/minute. This data indicates a linear relationship of deposition rate with respect to silane concentration. Extrapolation of the curves indicates a deposition rate approaching zero at zero percent silane, as would be expected at these temperatures.

Figure 4:
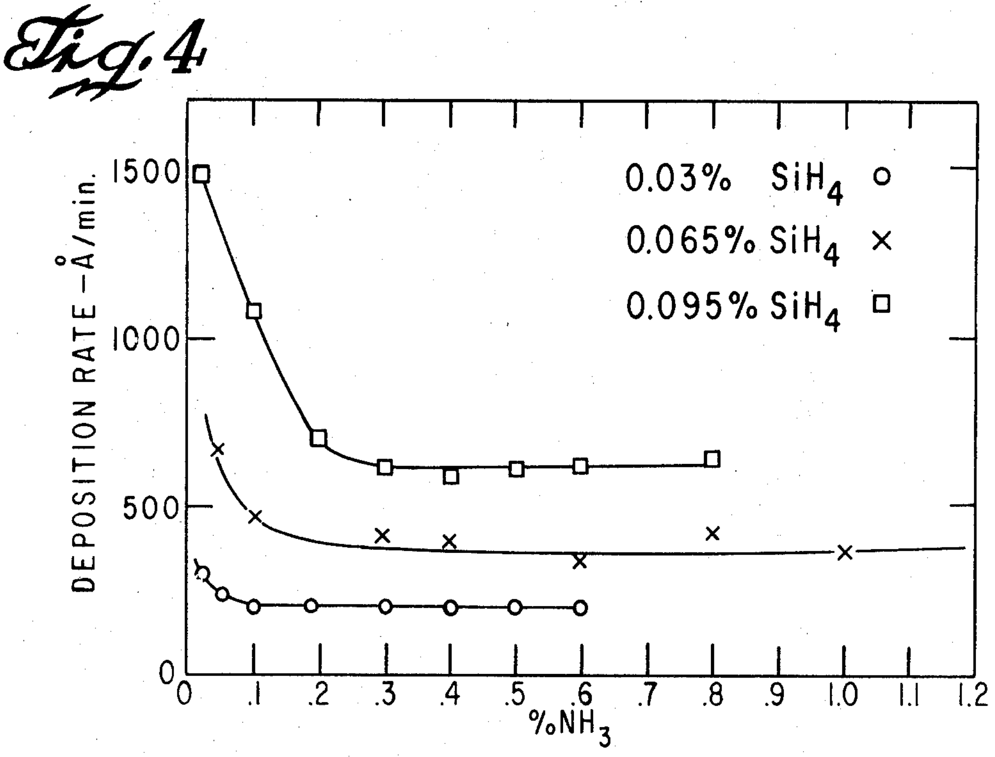
FIG. 4 is a graph showing the relation of the deposition rate of silicon nitride and the concentration of ammonia in the reactant gas stream.

A graph of deposition rate as a function of ammonia concentration at 0.03%, 0.065% and 0.095% silane is shown in FIG. 4 for films deposited at a temperature of 850° C. and from a gas stream having a flow rate of 40 liters/minute. Note the 0.065% silane curve. Below an ammonia concentration of about 0.3% there is an increase in deposition rate due to a change in the stoichiometry of the film. It has been determined that films deposited with an ammonia concentration below 0.3% and with a 0.065% silane concentration are silicon rich. These percentages correspond to a silane-ammonia ratio of approximately 1:5 or 0.2. For the other two silane percentages shown, the increase in deposition rate occurs at nearly the same silane ammonia ratio. It should be noted that the deposition rate at very low ammonia concentration approaches the silicon deposition rate from pure silane in the same reactor.

Using a gas stream having a silane-ammonia ratio of about 1:20 or 0.05, films approximately 5000 A. thick were deposited at 850° C. on silicon substrates for a study of the effect of thermal cycling. Film thicknesses were measured with an ellipsometer. The slices were subjected to two and ten minute hydrogen cycles at 1000° and 1200° C., and the film thicknesses were remeasured. These results are collected in Table I.

TABLE I.—STABILITY OF SILICON NITRIDE FILM TO THERMAN CYCLING IN HYDROGEN

| Sample | Original film thickness, A. | Thickness after heating | Change in thickness, A. |
|---|---|---|---|
| 37-1-2 | 5,065 | 4,950 | −115 |
| 38-1-2 | 4,870 | 4,700 | −170 |
| 38-2-2 | 5,140 | 4,995 | −145 |
| 39-2-2 | 5,340 | 5,115 | −225 |
| 47-2-2 | 5,660 | 5,620 | −40 |
| 48-1-2 | 4,835 | 4,845 | 10 |
| 48-2-2 | 5,140 | 5,135 | −5 |
| 49-1-2 | 4,095 | 4,095 | 0 |
| 49-2-2 | 5,380 | 5,340 | −40 |
| 50-1-2 | 5,310 | 5,315 | 5 |

The first two samples were heated for two minutes in $H_2$ at 1200° C. The next two samples were heated for two minutes in $H_2$ at 1000° C. followed by a ten-minute treatment at 1200° C. Note that the loss in thickness for these two different treatments was roughly the same (≈150 A.). These tests indicate that the films are quite stable at 1200° C. in $H_2$. The remaining six samples were heated for two minutes in $H_2$ at 1000° C., resulting in virtually no loss in thickness. As further evidence of stability, no change in the index of refraction was observed after thermal cycling.

A series of etch rate studies was made using Bell #2 etch (300 cc. $H_2O$+200 gm. $NH_4F$ 45 cc. HF) contained in a constant temperature bath which was controlled to within ±0.1° C. of the desired temperature. Slices having a silicon nitride film of known thickness were etched for a specified length of time with constant stirring and then remeasured with the ellipsometer to determine the change in film thickness.

Figure 5:
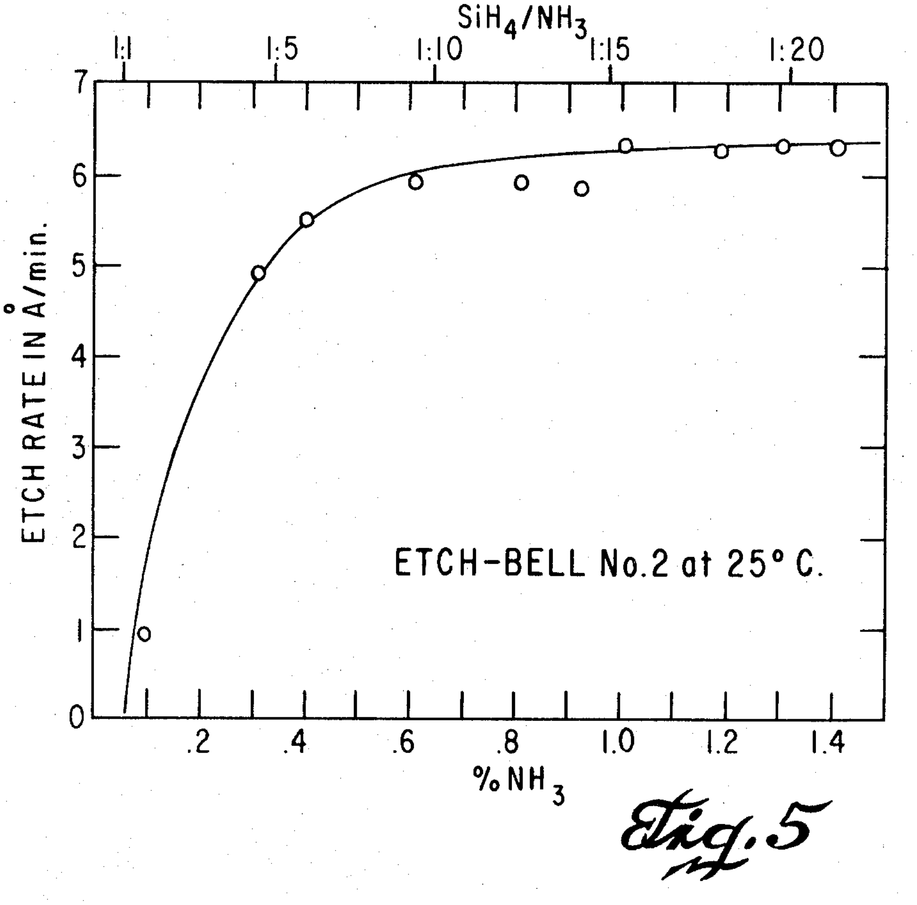
FIG. 5 is a graph showing the relation of etch rate and the concentration of ammonia in the reactant gas stream.

A graph of etch rate versus changing ammonia concentration at an etch temperature of 25° C. is shown in FIG. 5 for films deposited at 850° C. from a gas stream containing 0.065 volume percent silane and volume percentages of ammonia ranging from less than 0.05 to 1.5 and having a flow rate of 40 liters/minute. Above approximately 0.4% ammonia the etch rate is uniform (≈6.25 A./min.), but below this concentration the etch rate decreases rapidly and approaches zero. This is taken as additional evidence that the films become silicon rich in this region and with Bell #2 as an etchant, one would expect this decrease in etch rate.

Figure 6:
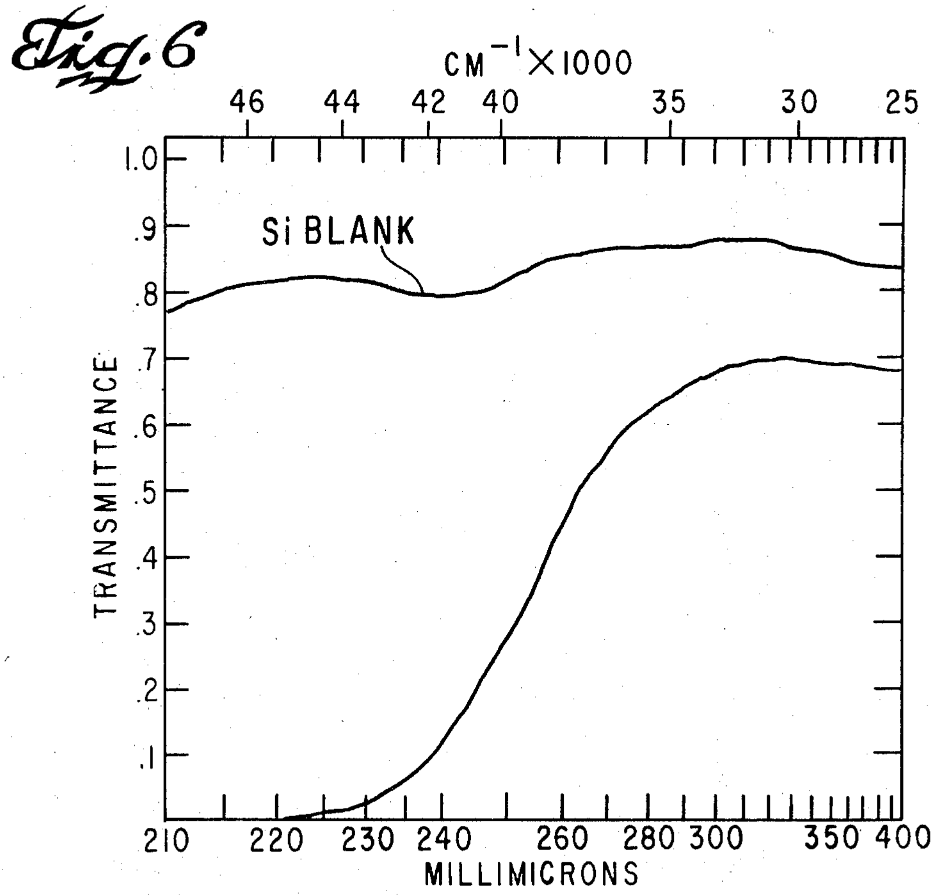
FIG. 6 is a graph indicating the optical transmission of a particular composition of silicon nitride vs. wave length.
Figure 7:
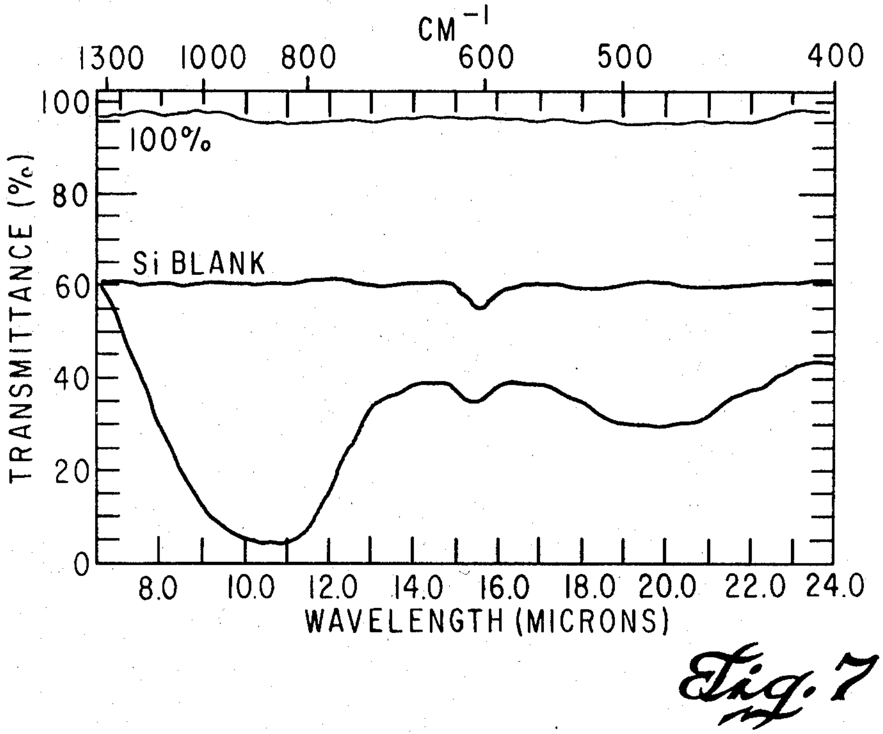
FIG. 7 is a graph indicating the infrared transmission of a particular composition of silicon nitride vs. wave length.

Optical transmittance data was obtained over the range from 0.2 to 24 microns for films deposited at 850° from a reactant gas stream containing 0.065 volume percent $SiH_4$ and 1.2 volume percent $NH_3$ and having a flow rate of 40 liters/minute. Between wave lengths of 0.22 and 0.40 micron, films deposited on fused silica blanks were used. FIG. 6 gives a typical curve and indicates an absorption edge at about 280 millimicrons (4.4 ev.). Between wave lengths of 0.4 and 8 microns there appears to be no absorption band. Above wave lengths of 8 microns the most prominent absorption is that due to the Si—N bond which occurs in the 10–12 microns range as shown in FIG. 7.

Figure 8:
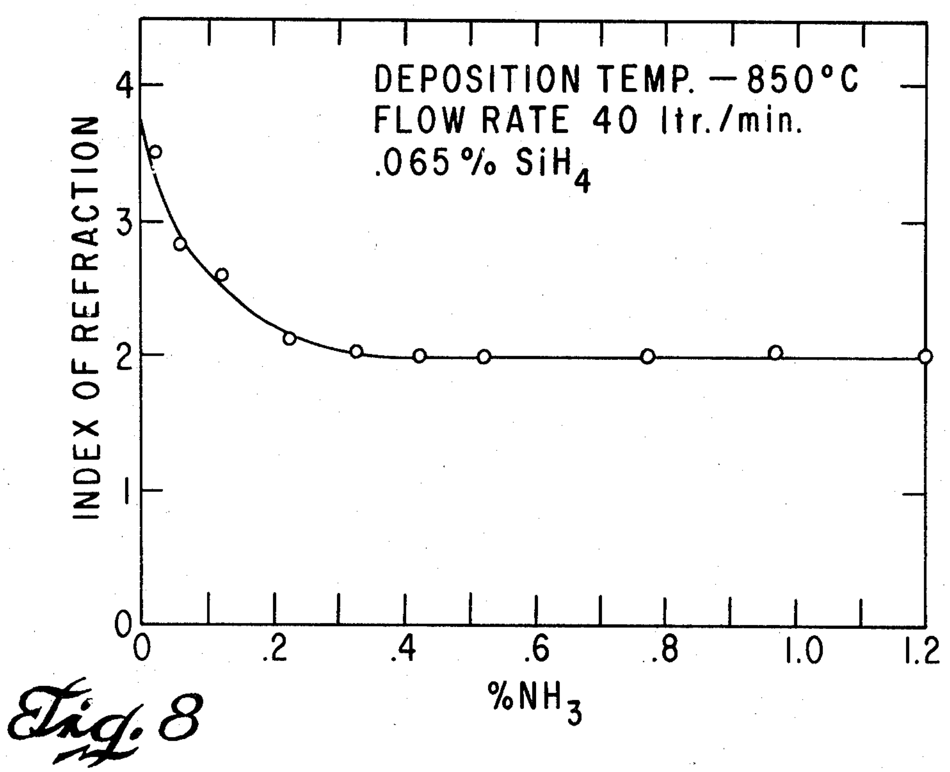
FIG. 8 is a graph showing the relation of the index of refraction of silicon nitride and the concentration of ammonia in the reactant gas stream.

The index of refraction of several films was determined from ellipsometer measurements at 5461 A. The dependence of refractive index upon the silane to ammonia ratio is shown in FIG. 8 for films deposited at 850° C. from a gas stream containing 0.065 volume percent silane and volume percentages of ammonia ranging from nearly zero to 1.2, and having a flow rate of 40 liters/minute. Over most of the compositional range the refractive index varies from 2.0 to 2.05, but as the gas stream percentage of ammonia is decreased below 0.3% (a silane-ammonia ratio of about 0.22), an increase in the index of refraction is noted. FIG. 8 illustrates that under the given reaction conditions, decreasing the ammonia percentage from about 0.45 to zero, the index of refraction of the deposited films increases from 2 to about 4. Stated in terms of the silane-ammonia ratio, increasing the silane-ammonia ratio from about 0.14 to infinity (i.e., zero percent ammonia) increases the index of refraction from 2 to 4. It is believed that the index increases uniformly to that of silicon (about 4.02) as the ammonia concentration is decreased to zero, which is taken as confirming evidence of the silicon rich nature of such films.

Thus, for example, if a silicon nitride film having a refractive index of 3 is desired, it can be seen from FIG. 8 that such a film can be obtained by using 0.05 volume percent ammonia together with the other conditions given for FIG. 8. This corresponds to a silane-ammonia ratio of 1.3.

DIELECTRIC PROPERTIES

Figure 9:
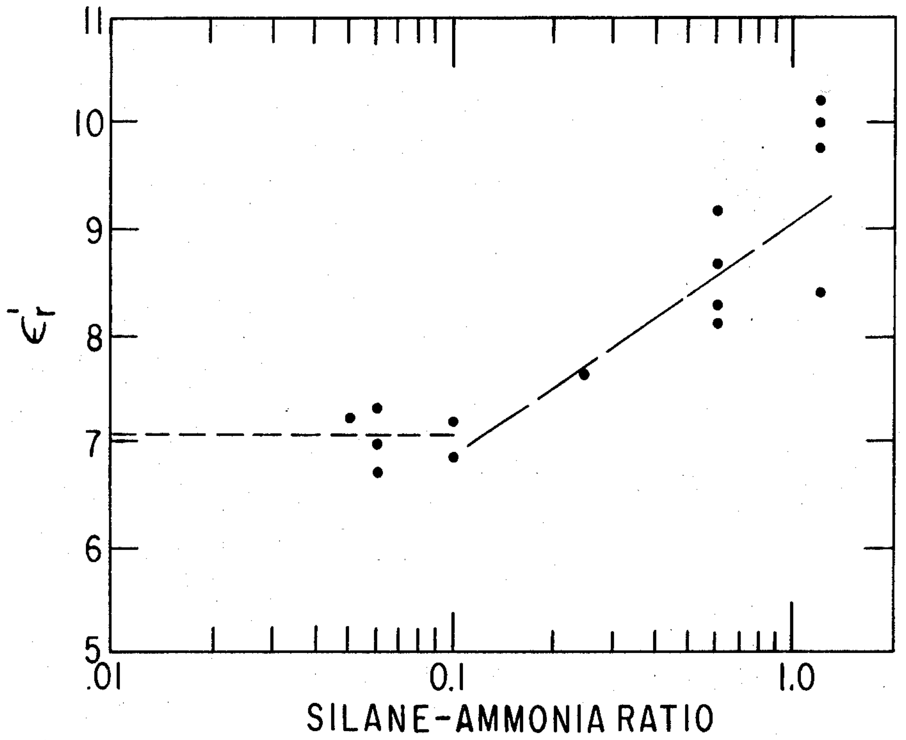

As described in the foregoing, varying ratios of silane to ammonia can be used in the deposition of the silicon nitride. FIG. 9 represents a plot of the relative dielectric constant vs. the silane-ammonia ratio. There is a trend toward a larger relative dielectric constant at the larger silane-ammonia ratios, i.e., the more silicon rich the material, the lesser the resistivity. Likewise, a plot (not shown) of the dielectric loss vs. frequency for various silane-ammonia ratios indicates that the dielectric loss, and hence conductivity, increases with increasing silane-ammonia ratios.

As may be seen from FIG. 9, at a silane-ammonia ratio less than 0.1, the dielectric constant of the deposited film is about 7. As the silane-ammonia ratio is increased above 0.1, the dielectric constant increases toward 10 at a silane-ammonia ratio of 1.0. Thus, for example, if a silicon nitride film having a dielectric constant of 8 were desired, FIG. 9 indicates that such a film could be obtained at a silane-ammonia ratio of from 0.3–0.4.

MECHANICAL PROPERTIES

Figure 10:
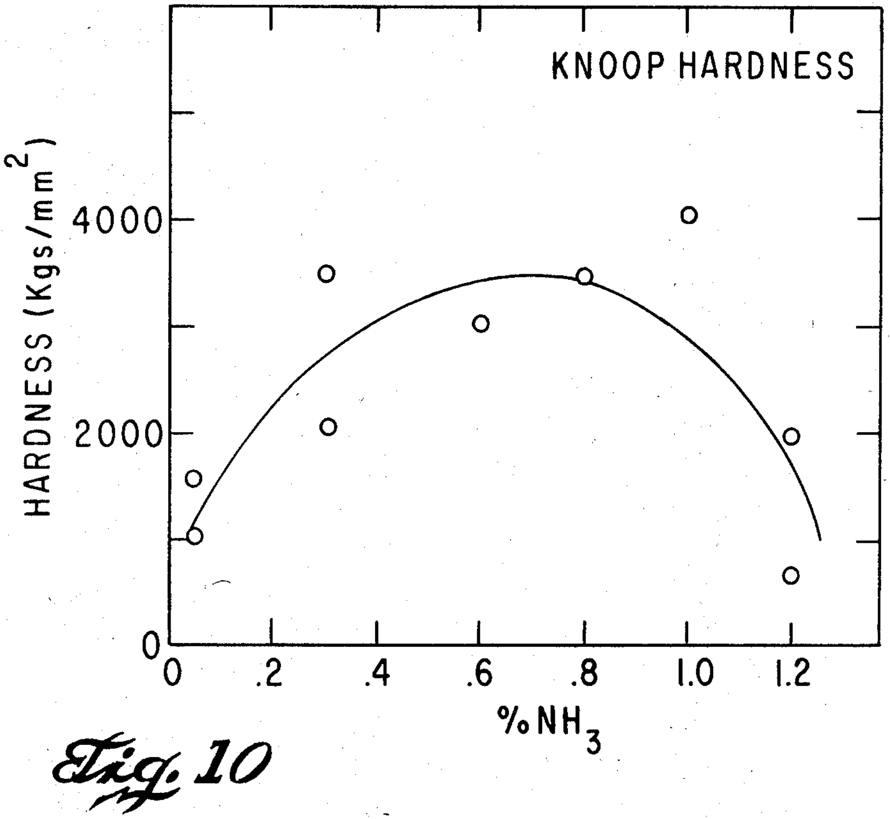
FIG. 10 is a graph showing the relation of the hardness of silicon nitride and the concentration of ammonia in the reactant gas stream.

Knoop microhardness measurements (with an 8 gm. load) were made on a series of 10,000 A. thick films deposited at 850° C. on a silicon substrate. The silane concentration was held constant at 0.065%, with $NH_3$ percentage from 0.05 to 1.2. The results, shown in FIG. 10, indicate appreciably softer films at each end of the composition range. The variation at the low ammonia end coincides with the observed change of index of refraction (FIG. 8), but the decrease at the other end was unexpected and is not yet explained.

Young's modulus and breaking strength were determined from a film 0.34 mil thick deposited at 850° C. on a silicon substrate from a gas composition of 0.1% $NH_3$, 0.065% $SiH_4$ and 99.84% hydrogen. Holes were etched through the silicon substrate in diameters of 55, 75 and 180 mils. Young's modulus was then computed from deflection versus pressure as measured on the 180 mil diameter film. This value, coupled with maximum pressure required for failure, was used to compute breaking stress. This stress increased as the size of the hole decreased and would be expected since the edges became progressively smoother as the hole became smaller. Values ranged from 67,000 p.s.i. for the largest diameter to 135,000 p.s.i. for the 55 mil diameter. It should be noted that this data is from a silicon rich film. The coefficient of thermal expansion was not measured directly, but it is reasonably close to and somewhat greater than that of silicon ($4.2\times10^{-6}$/° C. from 0° to 1000° C.) and can be changed by compositional variation of the reactant stream. It should be noted that this value is appreciably larger than that reported in the literature for sintered samples, which is $2.5\times10^{-6}$/° C.

The method of the invention includes the formation of graded composition films, by which is meant a coating of a first composition is initially deposited and the composition of the reactant gas stream is gradually changed during deposition to produce a different composition at the outer surface. Such films are desirable to achieve compatibility or to match the coefficients of thermal expansion of substrate and coating to produce improved adhesion. For example, the first composition is selected for its compatibility with the substrate, and the second composition is selected for its hardness. Thus, deposition upon a silicon substrate for certain electronic device applications is begun with a silane-ammonia ratio which produces a silicon rich deposit. The silane-ammonia ratio is then decreased to produce a hard, but readily etched dielectric coating.

A highly advantageous application of the method of the invention comprises the tailoring of the dielectric constant of thin films of silicon nitride for use as insulators in thin film capacitors. It is thus possible to change the ratio of capacitance to area of the dielectric at a given thickness by adjusting the dielectric constant of the silicon nitride film as discussed above with reference to FIG. 9. This capability is especially important when the dimensions of the device must be small and capacitance cannot be increased by increasing the area of the dielectric. Moreover, chemically vapor deposited thin films are inherently better in continuity than genetic oxides.

This technique of tailoring the dielectric constant of thin films of silicon nitride is further applicable to MIS (metal-insulator-semiconductor) field effect transistors (FET), as the gate region of a MIS FET is essentially a thin film capacitor. The transconductance will be more than 2½ times as great as when silicon oxide is used as a dielectric, silicon oxide having a dielectric constant of 3.8. The higher dielectric constant of the material made in accordance with this invention permits the insulative layer at the gate region to be made thicker while retaining the same capacitance. For example, a dielectric constant of 8 permits a layer of silicon nitride more than twice as thick as the silicon oxide layer presently used. This increased thickness results in greater device reliability and substantially better yields in fabricating the MIS transistors.

A particularly advantageous application of the method of this invention lies in the formation of protective low reflectance coatings for optical lenses and photosensitive devices such as solar cells and infrared detectors. The conversion of solar radiation into electrical energy by means of a semiconductor (usually silicon) P-N junction photocell is known in the art. Present solar photocells consist of a very thin wafer of silicon with an electron-rich N region and a hole-rich P region. When light particles, referred to as photons, are absorbed by the silicon crystal, hole-electron pairs are generated. The electric field existing in the wafer then forces the holes into the P region and the electrons into the N region, thereby making the P region more positive and the N region more negative. Displacement of these newly freed charges therefore causes a voltage to be developed between the crystal ends which can supply electrical energy to an external circuit.

The solar cell, however, is unable to convert into electrical energy the photons incident on the exposed semiconductor surface which are reflected and therefore lost. This reflectance appreciably limits the efficiency of the cell and consequently the amount of the electrical energy obtainable from it. It has been found, however, that by providing a reflection-reducing coating on the surface of the cell, the amount of energy reflected by the surface of the cell can be substantially reduced and thus its efficiency as an energy converter can be increased.

Presently, silicon solar cells have a thin layer of silicon monoxide formed on their surface, this layer serving as the low reflectance coating. Due to the physical and chemical instability of silicon monoxide, however, a portion of its surface must be converted to silicon dioxide, which provides the necessary protection of the underlying monoxide layer. Silicon dioxide, however, due to its lower refractive index and therefore consequent higher reflectivity, reduces the overall efficiency of the cell.

In addition, it has been observed that radiation damage to solar cells in outer space can be cured by heating the cell to a predetermined temperature (approximately 400° C.) and then cooling it. It would be desirable to perform this annealing operation while the cells are in space, but the instability of the silicon monoxide layer at the annealing temperature makes this impractical.

Co-pending patent application Ser. No. 561,809 filed June 30, 1966 and also assigned to the assignee of the present application, describes the use of silicon nitride as a low reflectance coating for solar cells. This material has been found to have a lower reflectance than many other materials used heretofore, and in addition, exhibits improved physical and chemical properties which makes its use of special import. Due to its refractory character, solar cells utilizing this material as the low reflectance coating can be radiation damage annealed.

A specific application of the method of this invention comprises the tailoring of the refractive index of silicon nitride as a protective, low reflectance coating for solar cells. Ideally, such a coating should have an index of refraction equal to the square root of the product of the refractive indices of the material to be protected and the material adjacent the opposite surface of the coating. For example, in the case of a solar cell the silicon of the photojunction has an index of refraction of 4.3 at 0.5 micron wavelength radiation and the adhesive material on the opposite side of the coating has an index of refraction of about 1.2 to 1.3. This means that the silicon nitride coating in order to minimize reflectance, should have a refractive index of about 2.3 to 2.4, which can be achieved in accordance with the method of the invention. R.F. glow discharge techniques may be preferred, however, so that deposition can be accomplished at lower temperatures. As may be seen from FIG. 8, a silicon nitride film having an index of refraction of 2.3 to 2.4 can be obtained at an ammonia concentration of 0.15–0.17 volume percent. This corresponds to a silane to ammonia ratio of 0.38–0.43.

In summary, a method of chemically vapor depositing silicon nitride films having selected physical and chemical properties has been described. It has been shown that at relatively high silane-ammonia ratios (e.g., in excess of 0.1), the characteristics of the films vary markedly as the silane-ammonia ratio approaches infinity, i.e., as the ammonia concentration is reduced to zero. The teachings of the invention make possible the deposition of silicon nitride films having one or more specified desirable characteristics such as a high dielectric constant, greater hardness, or increased index of refraction.

The teachings of the invention further include the deposition of graded composition silicon nitride films, the characteristics of which vary with composition.

It is to be understood that the above-described applications of the method of the invention are merely illustrative of its principles. Various other modifications may be devised by those skilled in the art without departing from the spirit and scope of the invention as defined by the appended claims.

What is claimed is:

1. A method for the chemical vapor deposition of a silicon nitride-comprising film on the surface of a substrate which comprises exposing said substrate at a temperature of 700° to 900° C. to a reactant gas stream containing silane and ammonia, while maintaining the ratio of volume percent silane to volume percent ammonia in said gas stream no greater than 0.065/0.4 whereby the etch rate of the resultant film is increased.

2. A method as defined by claim 1 wherein said reactant stream contains about 0.065 volume percent silane and at least 0.4 volume percent ammonia.

3. A method for providing a silicon substrate with a silicon nitride film of graded composition which comprises exposing said substrate at a temperature between 700° and 900° C. to a reactant stream comprising silane and ammonia, initially maintaining a ratio of silane to ammonia in said reactant stream which corresponds to the deposition of a silicon-rich silicon nitride film, and thereafter decreasing the volume percent silane to volume percent ammonia ratio below 0.065/0.4 to produce a hard but readily etched dielectric coating.

References Cited

UNITED STATES PATENTS 3,017,251 1/1962 Kelemen -------- 117—106(A)

FOREIGN PATENTS 1,006,803 10/1965 Great Britain -------- 117—106
1,136,315 4/1963 Germany.
1,190,308 10/1959 France ------------- 117—106

OTHER REFERENCES

H. F. Sterling and R. C. G. Swann, The Radio Frequency Initiated Vapor Deposition of Glassy Layers, in Physics and Chemistry of Glasses, vol. 6, No. 3, June 1965, pp. 109 and 110.

Electronics, vol. 39, Jan. 10, 1966, p. 164.

V. Y. Doo, D. R. Nichols, and G. A. Silvey, Preparation and Properties of Pyrolytic Silicon Nitride in Journal of the Electrochemical Society, December 1966, vol. 113, No. 12, pp. 1279–81.

ALFRED L. LEAVITT, Primary Examiner

C. K. WEIFFENBACH, Assistant Examiner

U.S. Cl. X.R.

117—106, 201, 215